United States Patent
Szego et al.

(10) Patent No.: US 10,351,423 B2
(45) Date of Patent: Jul. 16, 2019

(54) PROCESSES FOR SYNTHESIS OF REDUCING GASEOUS MIXTURES STARTING FROM HYDROCARBON STREAMS AND CARBON DIOXIDE

(71) Applicants: Eduardo Luigi Szego, Milan (IT); Marco Derudi, Arcisate (IT)

(72) Inventors: Eduardo Luigi Szego, Milan (IT); Marco Derudi, Arcisate (IT)

( * ) Notice: Subject to any disclaimer, the term of this patent is extended or adjusted under 35 U.S.C. 154(b) by 0 days.

(21) Appl. No.: 15/576,968

(22) PCT Filed: May 27, 2016

(86) PCT No.: PCT/IB2016/053141
§ 371 (c)(1),
(2) Date: Nov. 27, 2017

(87) PCT Pub. No.: WO2016/193886
PCT Pub. Date: Dec. 8, 2016

(65) Prior Publication Data
US 2018/0155191 A1    Jun. 7, 2018

(30) Foreign Application Priority Data

May 29, 2015 (IT) .................. 102015000009942

(51) Int. Cl.
*C01B 3/34* (2006.01)
*C10G 2/00* (2006.01)
(Continued)

(52) U.S. Cl.
CPC ............ *C01B 3/34* (2013.01); *A47J 37/0611* (2013.01); *A47J 37/0629* (2013.01); *C10G 2/30* (2013.01);
(Continued)

(58) Field of Classification Search
CPC .................. C01B 3/34; C01B 13/0073; C01B 2203/0222; C01B 2203/0283;
(Continued)

(56) References Cited

U.S. PATENT DOCUMENTS

| 5,316,750 A | 5/1994 | Szegu et al. |
| 2009/0314993 A1 | 12/2009 | Zhang et al. |
| 2015/0045456 A1* | 2/2015 | Schoedel .................. C01B 3/34 518/702 |

FOREIGN PATENT DOCUMENTS

| CA | 2388847 | * 5/2001 | .............. C01B 3/34 |
| CN | 1 351 953 A | 6/2002 | |

(Continued)

OTHER PUBLICATIONS

International Search Report and Written Opinion dated Oct. 10, 2016, in PCT Application No. PCT/IB2016/053141, 11 pages.
(Continued)

*Primary Examiner* — Jafar F Parsa
(74) *Attorney, Agent, or Firm* — MH2 Technology Law Group LLP

(57) ABSTRACT

A process for reducing metal ore may include: carrying out a reaction between a stream of carbon dioxide and a stream of at least one hydrocarbon, at pressure greater than or equal to 0.5 atmospheres (atm) and less than or equal to 100 atm and at temperature greater than or equal to 800° C. and less than or equal to 1,350° C., to produce a reducing gaseous stream comprising at least $H_2$, CO, $CO_2$, and water vapor; and/or reducing at least one metal ore using the reducing gaseous stream so as to obtain at least one reduced metal material and at least one exhausted gaseous stream comprising at least $CO_2$ and water vapor.

20 Claims, 3 Drawing Sheets

(51) Int. Cl.
*A47J 37/06* (2006.01)
*C21B 13/00* (2006.01)

(52) U.S. Cl.
CPC .. C21B 13/0073 (2013.01); *C01B 2203/0222* (2013.01); *C01B 2203/0283* (2013.01); *C01B 2203/06* (2013.01); *C01B 2203/061* (2013.01); *C01B 2203/062* (2013.01); *C01B 2203/0827* (2013.01); *C01B 2203/1241* (2013.01); *C01B 2203/148* (2013.01); *C21B 2100/22* (2017.05); *C21B 2100/24* (2017.05); *C21B 2100/282* (2017.05); *Y02P 10/136* (2015.11)

(58) Field of Classification Search
CPC .......... C01B 2203/06; C01B 2203/061; C01B 2203/062; C01B 2203/0827; C01B 2203/1241; C01B 2203/148; C01B 2100/22; C01B 2100/24; C01B 2100/282
See application file for complete search history.

(56) References Cited

FOREIGN PATENT DOCUMENTS

| | | |
|---|---|---|
| EP | 2 810 709 A1 | 12/2014 |
| WO | 01/031069 A1 | 5/2001 |

OTHER PUBLICATIONS

Italian Search Report and Written Opinion dated Jan. 19, 2016, in Italian Application No. UB20150548, 8 pages.
Database WPI, XP002753057, 2002, Thomson Scientific.

* cited by examiner

PROCESSES FOR SYNTHESIS OF REDUCING GASEOUS MIXTURES STARTING FROM HYDROCARBON STREAMS AND CARBON DIOXIDE

CROSS-REFERENCE TO RELATED APPLICATION(S)

This application is a national stage entry from International Application No. PCT/IB2016/053141, filed on May 27, 2016, in the Receiving Office ("RO/IB") of the International Bureau of the World Intellectual Property Organization ("WIPO"), published as International Publication No. WO 2016/193886 A1 on Dec. 8, 2016, and claims priority under 35 U.S.C. § 119 from Italian Patent Application No. 102015000009942, filed on May 29, 2015, in the Italian Patent and Trademark Office ("IPTO"), the entire contents of all of which are incorporated herein by reference.

The present invention relates to a process for the synthesis of a reducing gaseous mixture starting from a hydrocarbon stream and carbon dioxide. The mixture obtained can be used in the direct reduction of minerals, in particular iron ores, in the synthesis of products such as methanol and/or derivatives thereof, for example dimethyl ether, or in the processes of Fisher-Tropsch type for the synthesis of hydrocarbons.

It is known that in combustion processes of liquid and gaseous hydrocarbons for producing thermal and electric energy in large quantities, as for example in the case of thermal power plants, one of the major problems is the emission into the atmosphere, of high quantities of carbon dioxide produced in combustion. Analogously, the emission into the atmosphere of high quantities of $CO_2$ derives from various industrial processes among which direct reduction processes of natural minerals, prevalently consisting of metal oxides (in the case of iron ores, for example, the iron can be in the form of hematite ($Fe_2O_3$), magnetite ($Fe_3O_4$), limonite FeO (OH), sderite ($FeCO_3$) or pyrite ($FeS_2$)), which use reducing gases obtained from the partial conversion or oxidation, similar to reforming, of hydrocarbons. The excessive emission of $CO_2$ into the atmosphere over the years has consequently caused with time, an imbalance between $CO_2$ emissions into the atmosphere and the re-use of the same $CO_2$ in the biosphere.

U.S. Pat. No. 5,316,750 describes a combustion process of a hydrocarbon for energy production, wherein said hydrocarbon is reacted with the carbon dioxide produced during said combustion process.

Starting from the above known process, the Applicant has considered the problem of providing a process for the production of a high-quality gaseous mixture, i.e. with a high content of $H_2$ and/or CO, with a high reducing capacity imparted by a high ratio of reducing/oxidizing agents ($H_2$+CO)/($CO_2$+$H_2O$) and an adequate $H_2$/CO ratio for implementing the subsequent treatments or processes. Said reducing gaseous mixture, also known as synthesis gas or syngas, can also contain variable quantities of the unreacted starting hydrocarbon (e.g. methane), unreacted starting carbon dioxide, solid carbonaceous residues and impurities.

The Applicant has surprisingly found that the above problem is solved by causing a reaction, preferably non-catalytic, between a hydrocarbon stream, preferably methane, and a stream of carbon dioxide under pressure and temperature conditions defined within specific ranges.

A first aspect of the present invention therefore relates to a process for the synthesis of a gaseous mixture in which at least one hydrocarbon, preferably methane, is sent to a first step in which it is reacted with carbon dioxide, said process being characterized in that the reaction between said at least one hydrocarbon and carbon dioxide is carried out at a pressure ranging from 0.5 atm to 100 atm, preferably from 1 atm to 7 atm and at a temperature ranging from 800° C. to 1350° C., preferably from 800° C. to 1200° C., more preferably from 900° C. to 1200° C., even more preferably from 950° C. to 1100° C.

For the purposes of the present description and enclosed claims, the term "hydrocarbon stream" refers to a gaseous stream which comprises at least one hydrocarbon, for example at least methane.

For the purposes of the present description and enclosed claims, the term "stream of $CO_2$" refers to a gaseous stream which comprises at least $CO_2$.

The reaction between the at least one hydrocarbon and carbon dioxide is preferably a non-catalytic reaction, i.e. a reaction carried out in the absence of a catalyst. It has been observed, in fact, that when the reaction is carried out in the absence of a catalyst, syngas can be produced, avoiding problems of poisoning or sintering of the catalyst which, as is known, are the cause, in catalytic industrial production processes, of frequent interruptions and stoppages of the process for the substitution or regeneration of the catalyst.

It has also been observed that the greater consumptions associated with the higher temperature that may need to be used, in the absence of a catalyst, for obtaining higher yields or reaction rates are compensated: (i) by the higher reducing capacity of the syngas obtained, which, in turn, leads to a greater production effectiveness in the subsequent processes in which syngas is used; (ii) by a lower environmental impact due to the greater reduction in $CO_2$ emissions into the environment.

Furthermore, as the non-catalytic process is not affected by problems of deposition of carbonaceous residues on the catalyst, it has a higher flexibility with respect to the composition of the reagent mixtures at the inlet of the production step of syngas, not requiring, for example, the purification of the gaseous streams fed to the process.

The reaction between said at least one hydrocarbon and said carbon dioxide is preferably carried out at a pressure ranging from 30 atm to 100 atm, more preferably from 50 atm to 90 atm, even more preferably from 60 atm to 80 atm. These medium-high pressure conditions can be encountered, for example, when the at least one hydrocarbon and/or the carbon dioxide derive from streams coming from high pressure conditions, preferably from streams from hydrocarbon reservoirs, more preferably from streams deriving from natural gas reservoirs in exhaustion. The process for the production of syngas, object of the present invention, can therefore be advantageously used for exploiting in situ, almost exhausted natural gas reservoirs which generally contain high quantities of $CO_2$, in addition to residual natural gas. In this case, the stream coming from the reservoir, containing at least methane and $CO_2$, could consequently either partly or completely substitute the stream of carbon dioxide (11) and/or the hydrocarbon stream (10).

The definition of the pressure and temperature ranges indicated above advantageously allows a high-quality gaseous mixture to be obtained, i.e. having an optimal $H_2$/CO and ($H_2$+CO)/($CO_2$+$H_2O$) ratio for using the mixture in various industrial applications.

The reducing gaseous mixture that can be obtained from the process according to the invention can be advantageously sent, for example, directly to the furnaces specifically prepared for the direct reduction of metal ores or to reactors for the synthesis of other chemical products of interest, such as methanol and/or derivatives thereof, for example, dimethyl ether, or processes of the Fisher-Tropsch type.

A second aspect of the present invention therefore relates to the use of the gaseous mixture obtained from the process defined above in the direct reduction of ores, in the synthesis of methanol and/or derivatives thereof, for example, dimethyl ether, or processes of the Fisher-Tropsch type.

According to a further aspect, the present invention also relates to a process for reducing a metal ore, such as iron ore, which comprises the following steps:

(i) carrying out a reaction, preferably non-catalytic, between a stream of carbon dioxide and a stream of at least one hydrocarbon, at a pressure within the range of from 0.5 atm to 100 atm and at a temperature within the range of from 800° C. to 1350° C., preferably from 800° C. to 1200° C., to produce a reducing gaseous stream comprising at least $H_2$, CO, $CO_2$, water vapour and possibly a solid carbonaceous residue;

(ii) reducing at least one metal ore using said reducing gaseous stream so as to obtain at least a reduced metal material and at least an exhausted gaseous stream comprising at least $CO_2$ and water vapour.

According to a further aspect, the present invention relates to a process for the synthesis of methanol and/or derivatives thereof, preferably dimethyl ether, which comprises:

carrying out a reaction between a stream of carbon dioxide and a stream of at least one hydrocarbon, at a pressure within the range of 0.5 atm-100 atm and at a temperature within the range of 800° C. to 1350° C., preferably 800° C. to 1200° C., to produce a reducing gaseous stream comprising at least $H_2$, CO, $CO_2$, water vapour;

reacting said reducing gaseous mixture to obtain methanol and/or derivatives thereof.

According to a further aspect, the present invention also relates to a process for the synthesis of at least one hydrocarbon which comprises:

carrying out a reaction between a stream of carbon dioxide and a stream of at least one hydrocarbon, at a pressure within the range of 0.5 atm-100 atm and at a temperature within the range of 800° C. to 1350° C., preferably 800° C. to 1200° C., to produce a reducing gaseous stream comprising at least $H_2$, CO, $CO_2$, water vapour;

subjecting said reducing gaseous mixture to a Fischer-Tropsch reaction to obtain at least one hydrocarbon.

With respect to the problem of the emission of carbon dioxide into the atmosphere, the process of the invention allows a partial or total recirculation of the $CO_2$ produced in processes in which syngas is used (e.g. combustion processes, reduction processes of metal ores) or already contained in gaseous streams such as those coming from natural gas reservoirs in partial exhaustion, to be efficiently and advantageously effected from an industrial point of view, thus preventing its release into the atmosphere.

Furthermore, the process according to the invention also allows a convenient recovery of at least a part of the energy used in the process itself. Furthermore, the production of undesired pollutants such as nitrogen oxides is also avoided by the process object of the present invention.

Further characteristics and advantages of the present invention will appear evident from the following detailed description.

According to a preferred aspect, in the first step of the process object of the present invention, in which the at least one hydrocarbon is reacted with carbon dioxide, the following reactions take place:

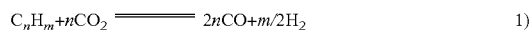

$$C_nH_m + nCO_2 \rightleftharpoons 2nCO + m/2 H_2 \quad\quad 1)$$

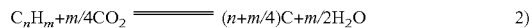

$$C_nH_m + m/4 CO_2 \rightleftharpoons (n + m/4)C + m/2 H_2O \quad\quad 2)$$

$$CO_2 + H_2 \rightleftharpoons CO + H_2O \quad\quad 3)$$

wherein n ranges from 1 to 12, preferably from 1 to 4, and m ranges from 4 to 26, preferably from 4 to 10.

If the at least one hydrocarbon is methane ($CH_4$), the following reactions take place in the first step:

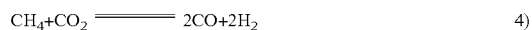

$$CH_4 + CO_2 \rightleftharpoons 2CO + 2H_2 \quad\quad 4)$$

$$CH_4 + CO_2 \rightleftharpoons 2C + 2H_2O \quad\quad 5)$$

$$CO_2 + H_2 \rightleftharpoons CO + H_2O \quad\quad 3)$$

In the case of prolonged reaction times, the following disproportionation reaction is also particularly active:

$$CO_2 + C \rightleftharpoons 2CO \quad\quad 6)$$

According to a preferred aspect of the present invention, the gaseous mixture obtained comprises $H_2/CO$ in a molar ratio ranging from 0.2 to 3.5, preferably from 1.0 to 2.4. Said molar ratio preferably ranges from 0.2 to 1.0 when the gaseous mixture is sent to processes for the synthesis of methanol and/or its derivatives, for example dimethyl ether, or to processes of the Fischer-Tropsch type.

According to another preferred aspect, the gaseous mixture obtained has a molar ratio of reducing/oxidizing agents $(H_2+CO)/(CO_2+H_2O)$ higher than 8, preferably from 8 to 25.

The gaseous mixture obtained in the first step is preferably sent to a second step. Said second step is preferably represented by direct reduction furnaces of minerals, in particular iron ores, in which the main products are water vapour and $CO_2$.

According to a further preferred aspect, said second step is represented by reactors for the synthesis of methanol and/or its derivatives, for example dimethyl ether, or reactors used in processes of the Fischer-Tropsch type.

According to another preferred aspect, the stream containing $CO_2$ or only the $CO_2$ produced in the second step as defined above, is partially or completely recirculated to the above-mentioned first step to effect the synthesis of the gaseous stream with a high reducing capacity according to the invention.

As an alternative to the stream containing carbon dioxide or to the recirculated carbon dioxide alone as described above, gaseous mixtures can be used in the first step, containing hydrocarbons, preferably methane, and carbon dioxide, such as, for example, gaseous mixtures present in natural gas reservoirs close to exhaustion.

According to another preferred aspect of the invention, the carbon produced in reactions 2) and/or 5) (carbonaceous solid residue) is separated, and the gaseous mixture produced in said first step is sent directly or following the removal of part of its water content, to a second step, in relation to the characteristics required by said second step.

A second aspect of the present invention relates to the use of the gaseous mixture obtained from the process as defined above in the direct reduction of minerals, in the synthesis of methanol and/or its derivatives, for example dimethyl ether, or in processes of the Fischer-Tropsch type.

DESCRIPTION OF THE FIGURES

The present invention is now described, for illustrative but non-limiting purposes, according to its preferred embodiments, with particular reference to the enclose figures, in which:

With reference to FIG. 1, it is supposed that a stream consisting of at least one hydrocarbon (10), preferably methane, is sent to a first step (12) in which, under the temperature and pressure conditions described above, the at least one hydrocarbon reacts with the carbon dioxide fed to said step (12) through a flow line (11).

In the case of direct reduction processes of ferrous metals, in the step (12), the temperature is preferably within the range of from 1000° C.-1200° C. and the pressure is preferably within the range of from 2 atm-7 atm.

Reactions 3), 4) and 5) as defined above, take place in said first step (12). In particular, according to the reaction 5), the production of carbon takes place, for example carbon black, which is separated, collected and stored by means of line (13) as useful product. The separation of carbon black and in general the carbonaceous residue produced in step (12), from the gaseous mixture (20), can be effected with various known processes. The gaseous mixture (20), for example, can be treated in an electrostatic precipitator, possibly after lowering the temperature of the gaseous mixture (20) to values compatible with the operating conditions of the electrostatic precipitator (e.g. 500-600° C.)

The separation of the carbon black can also take place during the possible treatment of the gaseous mixture (20) for the removal of the excess water through step 21 (to be preferably carried out at a temperature lower than 50° C.). In this case, the stream 22, mainly consisting of liquid water and solid products rich in carbon, can be possibly treated to recover and/or remove the solid containing carbon. The gaseous mixture (23) resulting at the end of this treatment, rich in $H_2$ and CO, can then be sent to the processes previously mentioned.

Figure 2:
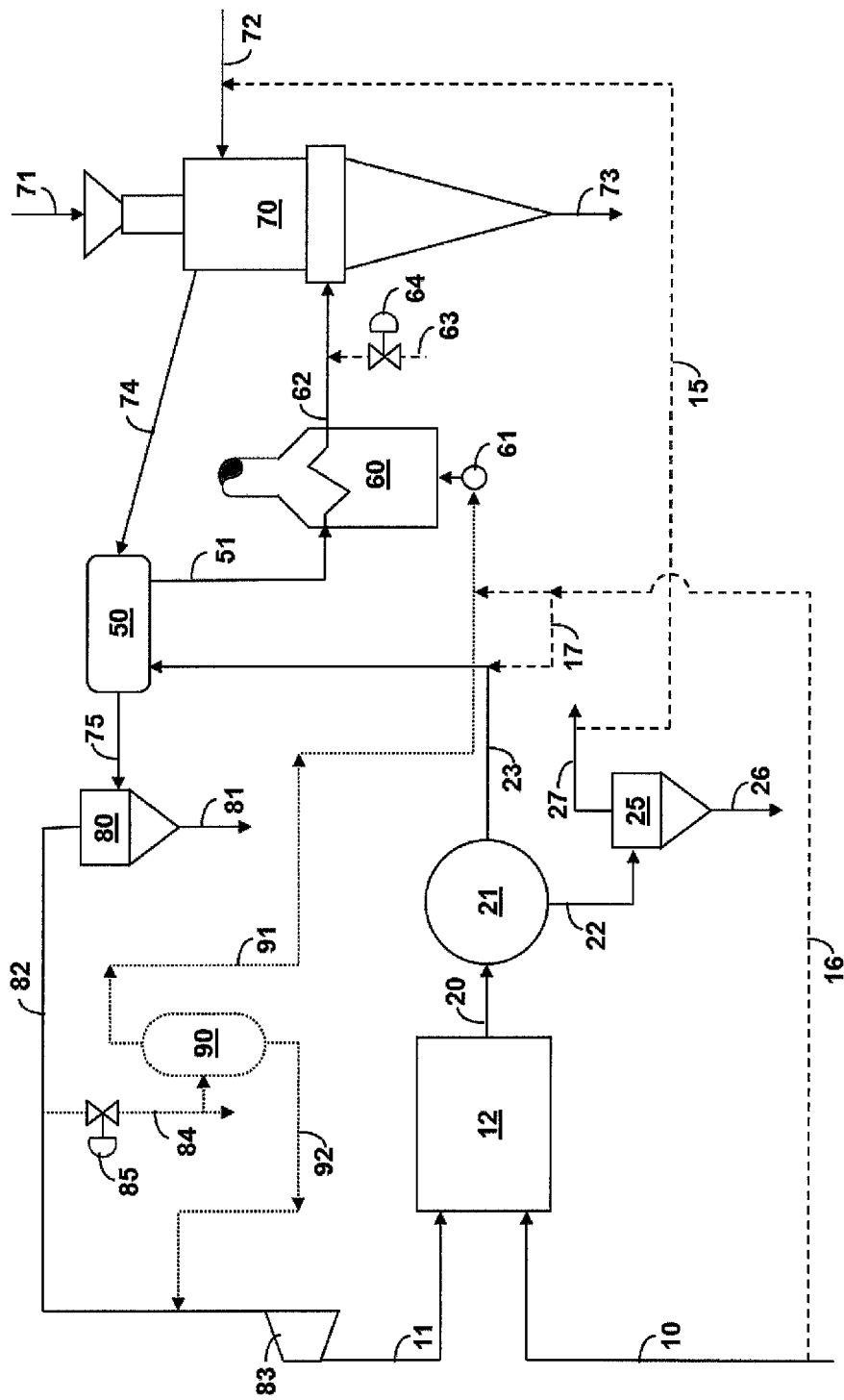
FIGS. 2 and 3 illustrate two alternative flowcharts of the process schematically described in FIG. 1.

With reference to FIG. 2, the stream (22) can be sent, for example, to a separation and/or recovery process of the solid containing carbon (25) which allows the recovery of a stream of liquid water (26) and a solid fraction mainly consisting of the carbonaceous residue (27), which can be collected and stored as useful product. The separation step (25) can comprise, for example, a mechanical filtration process or solvent extraction process.

Regardless of the feeding and operating conditions of the above-mentioned process, as the reactions involved take place at a high temperature, it should be understood that the stream (20) can be possibly used for effecting a recovery of heat and/or energy, allowing, for example, the partial preheating of the streams of reagents sent to the first step (10, 11). The gaseous mixture (23) leaving the above conversion or partial oxidation process of hydrocarbons, is conveyed to a direct reduction unit of minerals, in particular said mixture (23) enters the direct reduction furnace (70), after preferably being preheated; this operation can be carried out by effecting a thermal exchange between the stream (23) and the fumes leaving the head of the direct reduction apparatus (exhausted gaseous stream) through the flow line (74) inside the exchanger (50). The reducing gas, partially pre-heated (51), is then sent to a subsequent heating step (60) in order to be brought to a temperature suitable for carrying out the direct reduction process. The stream thus obtained (62) can be sent directly to the process (70) or, if necessary, it can be integrated with insufflation of oxygen (from the flow line (63)), regulated by means of the control system (64)), in order to partially modify its composition and temperature. The ratio of reducing/oxidizing agents $(H_2+CO)/(CO_2+H_2O)$ obtained in step (12) allows to considerably limit the requirement of oxygen insufflation (flow line (63)) for regulating the temperature of the gaseous mixture and oxidizing the excess of CO and $CH_4$ to $CO_2$, as the previous elimination of carbon in reaction 2) or 5) limits the presence of an excess of CO. This allows a marked reduction in the oxygen consumption (possibly up to its elimination) within the whole reduction process of metal ores, with a consequent energy and cost saving with respect to the production costs of high-purity oxygen of line (63). In addition to the gaseous mixture (62), the metal ores (e.g. iron ores) that must undergo the reduction process (71) also enter the direct reduction process (70) together with a solid rich in carbon (72) as solid reductant for favouring the carburization of the metals; said stream (72) can be possibly integrated with a fraction (flow line (15)) of the carbonaceous solid coming out of step (12) through line (13) or even substituted by the latter. In this way, there is the advantage of limiting the supply of material rich in carbon (solid reductant) used in the direct reduction process. The apparatus (70) therefore produces reduced metal materials enriched in C (line (73)) and a gaseous mixture still containing reducing gases but enriched in $CO_2$ and $H_2O$ and possibly other gaseous products such as nitrogen $N_2$ (line (74)).

The stream (74) is then sent to a heat exchanger (50) to be cooled to a temperature close to room temperature and is then conveyed (line (75)) inside a separation apparatus (80) for the possible removal of excess water and/or solid products in suspension, through line (81). As the gaseous stream leaving this treatment (82) is rich in $CO_2$ and still contains $H_2$ and CO and non-reacted hydrocarbons, it can be partially or totally recirculated to the process object of the present invention for converting in particular the $CO_2$, into reducing gas and carbon.

Alternatively, as the stream (74) is rich in $CO_2$ and $H_2O$ and still contains $H_2$, CO and non-reacted hydrocarbons, after a possible pre-heating and without being subjected to treatments suitable for reducing the $H_2O$ content, it can be partially or totally recirculated to the production step of syngas (12) for converting, in particular $CO_2$ and $H_2O$, into reducing gas and carbon. In this case, considering the $H_2O$ content present in the stream (74), the formation of carbon (line 13) produced in the first step (12) of the present invention can be limited, producing a reducing gaseous mixture (20) with a higher calorific value.

By regulating the quantity of the stream (74) recycled to the above-mentioned step (12), a reducing gaseous stream (20) can also be possibly produced, with a relatively low content of water and which can consequently be fed to the subsequent direct reduction process of metal ores without being previously subjected to any water removal treatment.

By integrating any direct reduction process of metal ores with the present invention, the production and release into the atmosphere of the $CO_2$ produced in direct reduction plants can be greatly limited, if not eliminated. If the first step of the present invention must operate under pressure, a compression step (83) of the recycled stream (82) can be envisaged, for allowing the stream rich in $CO_2$ (line (11)) to reach the pressure suitable for implementing the process (12).

The stream (82) typically also contains substantially inert gases (for example nitrogen $N_2$) which enter the process through the direct reduction step or that can be present in a small percentage in the hydrocarbon mixture (10). If said nitrogen enters the step, object of the present invention, the same remains substantially inert, as it does not produce nitrogen oxides (common polluting products for the atmosphere), as the temperature for carrying out the process is not high enough to make the $N_2$ reactive. Even if it does not participate in the processes described above, the presence of nitrogen in the plant and its potential accumulation in the recycling circuit of which line (82) forms a part, can lead to a loss in efficiency and an increase in the costs of the whole process; for this reason, its excessive accumulation should preferably be avoided. In these cases, for example, a regulation system of the accumulation of inert gases, controlled by the valve (85), can be envisaged, which allows part of the recycled stream (82) to be discharged through line (84). As this stream contains combustible products, it can be conveniently used as fuel gas (line 91) for feeding the burner (61), used for heating the equipment (60). In order to minimize the release of $CO_2$ into the atmosphere, the stream (84) can be treated in a step (90) for separating, as selectively as possible, the $CO_2$ from the gaseous mixture, by means, for example, of membrane processes or process of the Pressure Swing Adsorption (PSA) type, thus producing a fuel gas poor in $CO_2$ (line (91) and a stream (92) rich in $CO_2$ which can be joined again with the recycling (82) and sent to the process object of the invention.

Finally, the fuel gas (91) can consist of or also be integrated with a part of the hydrocarbon stream (10), through line (16); a fraction of this gas can be mixed with said stream through line (17), should it be necessary to enrich the reducing gas (23) with non-reacted hydrocarbons.

In an alternative configuration of the process according to the present invention (FIG. 3), the reducing gaseous stream (20) leaving the reaction step (12) can be further reacted in an apparatus (30) in order to produce a reducing gaseous mixture (23) with characteristics more suitable for the subsequent processes and/or treatments. In the apparatus (30), for example, a catalytic water gas shift (WGS) reaction 7) can be effected, preferably under adiabatic conditions. With this reaction, the conversion can be effected of at least a part of the water contained in the reducing gaseous stream (20), increasing the hydrogen content of the latter:

$$CO+H_2 \rightleftharpoons CO_2+H_2 \qquad 7)$$

The use of a WGS step is particularly advantageous if the water vapour content of the stream (20) is considered as being excessively high or in any case such as to be unsuitable for the use of the reducing gaseous stream (20) as such in a subsequent process or treatment. The water vapour content, in fact, depends on the temperature and pressure conditions of the synthesis step (12) of the reducing gaseous stream.

The WGS step not only increases the flexibility of the process but also has other advantages.

First of all, the reaction 7) consumes both water and CO, producing hydrogen and $CO_2$ and releasing heat. This implies an increase in the temperature of the reaction products and the $H_2/CO$ ratio of the reducing gaseous mixture, without altering, however, the high reducing capacity of the same (given by the ratio of reducing/oxidizing agents $(H_2CO)/(CO_2+H_2O)$). Furthermore, the WGS reaction can be conveniently carried out at a higher temperature (close to 400° C., for example) with respect to the water separation process of step (21) illustrated with reference to FIGS. 1 and 2, thus producing a reducing gaseous stream enriched in hydrogen (23) for which a lower energy consumption is required if said stream (23) must be further heated to be used in the subsequent processes or treatments. Regardless of the feeding and operating conditions of the above process, as the reactions involved are effected at high temperature, it should be understood that the stream (20) can possibly be used for effecting a heat and/or energy recovery, allowing, for example, the partial pre-heating of the streams of reagents (lines (10) and (11)) sent to the step (12). With reference to the conceptual schemes of FIG. 1 and FIG. 3, some embodiment examples of the process of the invention are also provided hereunder.

EXAMPLES

The following embodiment examples are provided for purely illustrative purposes of the present invention and should not be considered as limiting the protection scope defined by the enclosed claims.

Example 1

Figure 1:
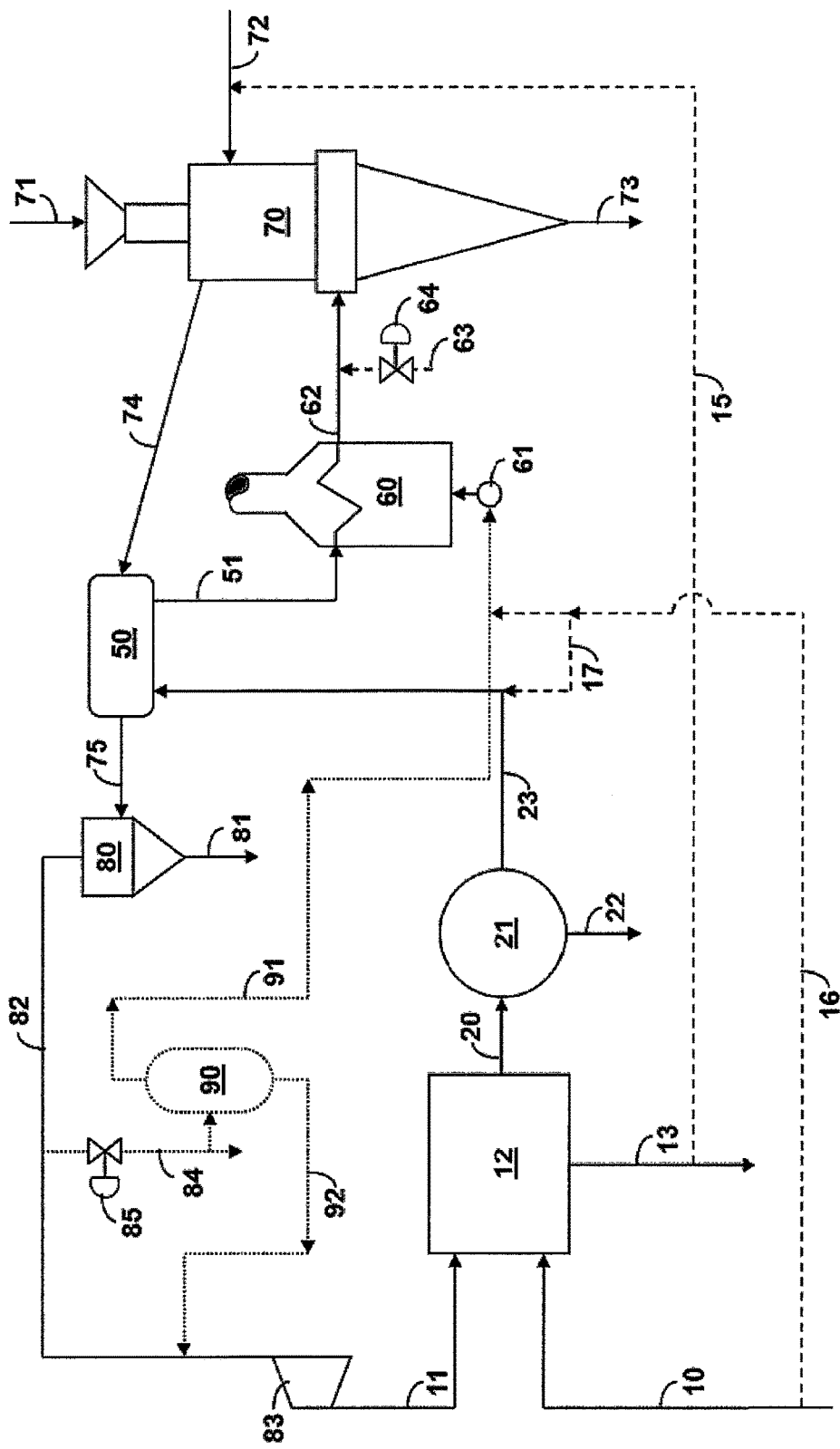
FIG. 1 schematically shows a flowchart of the process, wherein the gaseous mixture obtained is sent to a direct reduction unit of minerals, for example iron ores, starting from which reduced iron can be produced (so-called iron sponge or Direct Reduced Iron)

With reference to FIG. 1, the stream of methane (10), pre-heated to 950° C., was sent to the first step (12) with a unitary flow-rate of 1 kmole/t.u., (t.u. referring to "time unit"). The recycled $CO_2$ was sent, after heating, to the same step (12), in a quantity of 1 kmole of $CO_2$/kmole of $CH_4$. The following temperature and pressure conditions were established, 950° C. and 1 atm, respectively, in said first step (12). The step (12) was carried out in the absence of a catalyst. The reducing gaseous mixture (20) obtained was the following:

| | |
|---|---|
| CO | 0.57 kmoles/kmoles of incoming $CH_4$ |
| $CO_2$ | 0.45 kmoles/kmoles of incoming $CH_4$ |
| $H_2$ | 0.47 kmoles/kmoles of incoming $CH_4$ |
| $H_2O$ | 0.53 kmoles/kmoles of incoming $CH_4$ |
| $CH_4$ | 0.47 kmoles/kmoles of incoming $CH_4$ |

The solid effluent (line 13), i.e. carbon in the form of carbon black, was produced in an amount of 0.38 kmoles of C/kmole of incoming $CH_4$. The reducing gaseous mixture (20) has a Hz/CO molar ratio equal to 0.82. In this example, with reference to FIG. 1, the gaseous mixture (20) was sent to the direct reduction furnace (70).

Example 2 (Comparative)

The results obtained in Example 1 were compared with those obtained using the conditions described in U.S. Pat. No. 5,316,750 (temperature 600° C., pressure 30 atm, absence of catalyst), wherein the gaseous mixture (20) obtained was the following:

| | |
|---|---|
| CO | 0.06 kmoles/kmoles of incoming $CH_4$ |
| $CO_2$ | 0.52 kmoles/kmoles of incoming $CH_4$ |
| $H_2$ | 0.25 kmoles/kmoles of incoming $CH_4$ |
| $H_2O$ | 0.90 kmoles/kmoles of incoming $CH_4$ |
| $CH_4$ | 0.43 kmoles/kmoles of incoming $CH_4$ |

The solid effluent (line 13), carbon in the form of carbon black, was produced in an amount of 0.99 kmoles/kmole of incoming $CH_4$.

Example 3

With reference to FIG. 1, the methane stream (10), preheated to 1000° C., was sent to the first step (12) with a unitary flow-rate of (1 kmole/t.u.). The stream rich in $CO_2$ (11) deriving from the recirculation of the fumes of a direct reduction process of iron ores, was sent to the same step (12), after heating. The following temperature and pressure conditions were set for this first step (12), 1000° C. and 5 atm, respectively. The step (12) was carried out in the absence of a catalyst.

The composition of the overall reagent mixture entering the step (12) was the following:

| | |
|---|---|
| CO | 9.0% vol; |
| $CO_2$ | 23.0% vol; |
| $H_2$ | 28.0% vol; |
| $H_2O$ | 1.0% vol; |
| $CH_4$ | 32.0% vol; |
| $C_2H_6$ | 4.0% vol; |
| $N_2$ | 3.0% vol. |

The reducing gaseous mixture obtained (20) was the following:

| | |
|---|---|
| CO | 1.22 kmoles/kmoles of incoming $CH_4$; |
| $CO_2$ | 0.10 kmoles/kmoles of incoming $CH_4$; |
| $H_2$ | 2.41 kmoles/kmoles of incoming $CH_4$; |
| $H_2O$ | 0.33 kmoles/kmoles of incoming $CH_4$; |
| $CH_4$ | 0.26 kmoles/kmoles of incoming $CH_4$; |
| $C_2H_6$ | 0.0 kmoles/kmoles of incoming $CH_4$; |
| $N_2$ | 0.09 kmoles/kmoles of incoming $CH_4$. |

The solid effluent (line 13) i.e. carbon in the form of carbon black, was produced in the amount of 0.61 kmoles of C/kmole of incoming $CH_4$. The gaseous mixture (20) has a $H_2$/CO molar ratio equal to 1.97 and a molar ratio between the reducing agents and oxidizing agents $(H_2+CO)/(CO_2+H_2O)$ equal to about 8.45. In this example, with reference to FIG. 1, the gaseous mixture (20) was sent to the direct reduction furnace (70).

Example 4

Figure 3:
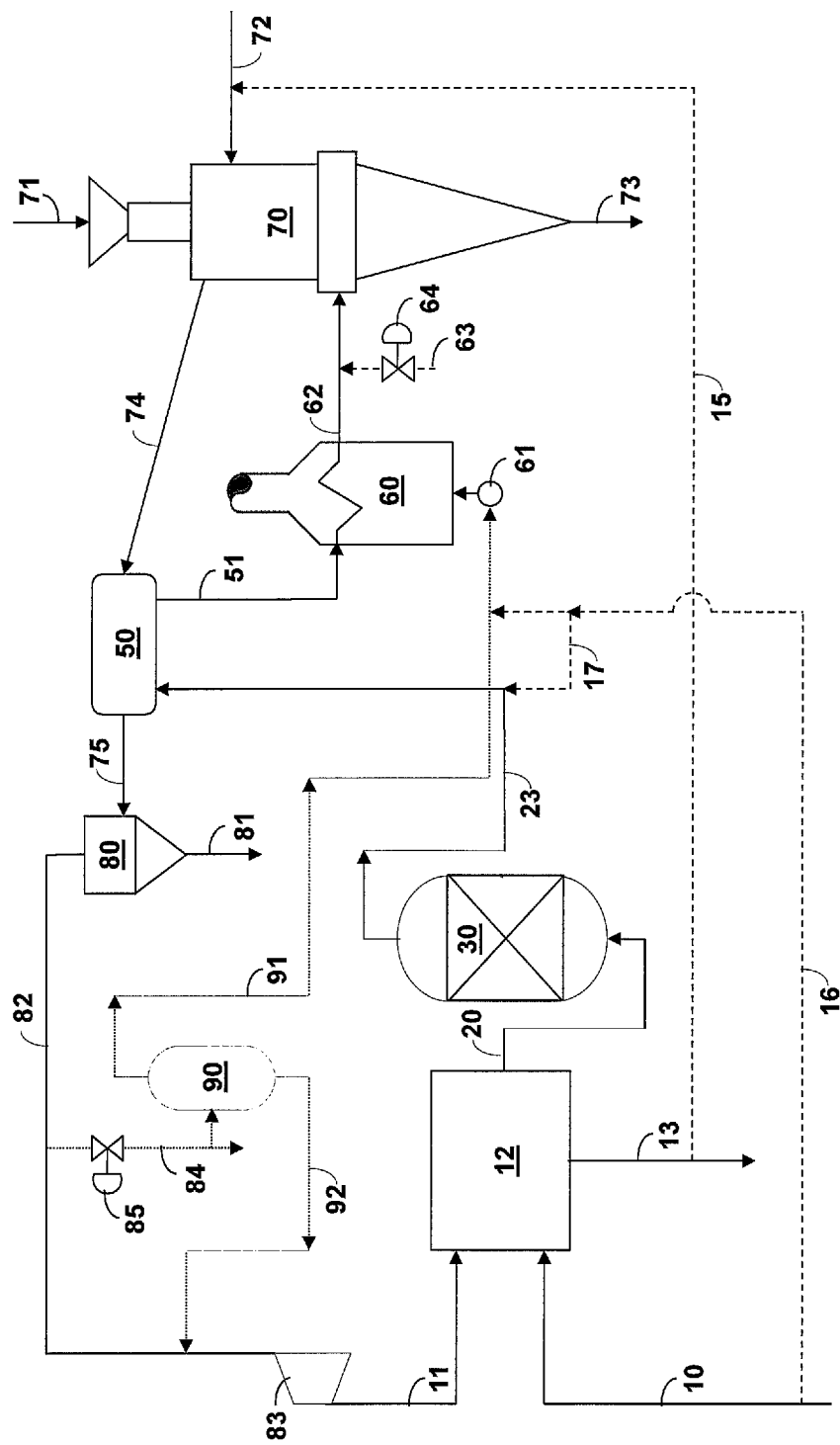

With reference to FIG. 3, the methane stream (10), preheated to 1000° C. was sent to the first step (12) with a unitary flow-rate of (1 kmole/t.u.). The stream rich in $CO_2$ (11) deriving from the recirculation of the fumes of a direct reduction process, was sent to the same step (12), after heating. Said first step (12) was carried out at a temperature of 1,000° C. and a pressure of 5 atm, in the absence of a catalyst.

The composition of the overall reagent mixture entering the step (12) was the same as the incoming mixture of Example 3, i.e.:

| | |
|---|---|
| CO | 9.0% vol; |
| $CO_2$ | 23.0% vol; |
| $H_2$ | 28.0% vol; |
| $H_2O$ | 1.0% vol; |
| $CH_4$ | 32.0% vol; |

-continued

| | |
|---|---|
| $C_2H_6$ | 4.0% vol; |
| $N_2$ | 3.0% vol. |

The reducing gaseous stream (20) obtained was subjected, after cooling, to a WGS reaction in the equipment 30. The WGS reaction was carried out under the same pressure conditions as the first step (12), i.e. 5 atm. and at a temperature of 400° C., in the presence of an iron-based catalyst. The reducing gaseous stream enriched in $H_2$ (23) obtained was the following:

| | |
|---|---|
| CO | 1.07 kmoles/kmoles of incoming $CH_4$; |
| $CO_2$ | 0.25 kmoles/kmoles of incoming $CH_4$; |
| $H_2$ | 2.56 kmoles/kmoles of incoming $CH_4$; |
| $H_2O$ | 0.18 kmoles/kmoles of incoming $CH_4$; |
| $CH_4$ | 0.26 kmoles/kmoles of incoming $CH_4$; |
| $C_2H_6$ | 0.0 kmoles/kmoles of incoming $CH_4$; |
| $N_2$ | 0.09 kmoles/kmoles of incoming $CH_4$. |

The solid effluent (line 13) i.e. carbon in the form of carbon black, was produced in an amount of 0.61 kmoles of C/kmole of incoming $CH_4$. The reducing gaseous mixture enriched in $H_2$ (23) has a $H_2$/CO ratio equal to 2.40 and a molar ratio between the reducing agents and oxidizing agents $(H_2+CO)/(CO_2+H_2O)$ equal to about 8.45. In this example, with reference to FIG. 3, the reducing gaseous mixture enriched in $H_2$ (23) was sent to the direct reduction furnace (70).

Example 5

A stream coming from a natural gas reservoir in partial exhaustion, containing methane and carbon dioxide, preheated to 1150° C., was sent to the first reaction step (12) with a unitary flow-rate of (1 kmole/t.u.). In said first reaction step (12), the following temperature and pressure conditions were set, 1,150° C. and 60 atm. respectively. The reaction step (12) was carried out in the absence of a catalyst. The composition of the overall reagent mixture entering the step (12) was the following:

| | |
|---|---|
| $CO_2$ | 40.0% vol; |
| $H_2O$ | 3.0% vol; |
| $CH_4$ | 50.0% vol; |
| $C_2H_6$ | 2.0% vol; |
| $N_2$ | 5.0% vol. |

The reducing gaseous mixture (20) obtained was the following:

| | |
|---|---|
| CO | 1.43 kmoles/kmoles of incoming $CH_4$; |
| $CO_2$ | 0.05 kmoles/kmoles of incoming $CH_4$; |
| $H_2$ | 1.57 kmoles/kmoles of incoming $CH_4$; |
| $H_2O$ | 0.12 kmoles/kmoles of incoming $CH_4$; |
| $CH_4$ | 0.24 kmoles/kmoles of incoming $CH_4$; |
| $C_2H_6$ | 0.0 kmoles/kmoles of incoming $CH_4$; |
| $N_2$ | 0.10 kmoles/kmoles of incoming $CH_4$. |

The solid effluent coming out of the reaction step (12) i.e. carbon in the form of carbon black, was produced in an amount of 0.14 kmoles of C/kmole of incoming $CH_4$. The reducing gaseous mixture has a $H_2$/CO molar ratio equal to 1.10 and a molar ratio between the reducing agents and oxidizing agents $(H_2+CO)/(CO_2+H_2O)$ equal to about 17.21. In this example, the reducing gaseous mixture is suitable for being fed to a direct reduction furnace of metal ores.

The invention claimed is:

1. A process for reducing at least one metal ore, the process comprising:
    carrying out a reaction between a stream of carbon dioxide and a stream of at least one hydrocarbon, at pressure greater than or equal to 0.5 atmospheres (atm) and less than or equal to 100 atm and at temperature greater than or equal to 950° C. and less than or equal to 1,350° C., to produce a reducing gaseous stream comprising at least $H_2$, CO, $CO_2$, and water vapour; and
    reducing the at least one metal ore using the reducing gaseous stream so as to obtain at least one reduced metal material and at least one exhausted gaseous stream comprising at least $CO_2$ and water vapours;
    wherein the reaction between the stream of the carbon dioxide and the stream of the at least one hydrocarbon is a non-catalytic reaction.

2. The process of claim 1, wherein the at least one exhausted gaseous stream is recirculated to the carrying out of the reaction between the stream of the carbon dioxide and the stream of the at least one hydrocarbon.

3. The process of claim 1, wherein the at least one exhausted gaseous stream is recirculated to the carrying out of the reaction between the stream of the carbon dioxide and the stream of the at least one hydrocarbon after removing the water vapour.

4. The process of claim 1, wherein at least part of the stream of the carbon dioxide comes from a natural gas reservoir in partial exhaustion.

5. The process of claim 1, wherein the reducing gaseous stream also comprises solid carbonaceous residue, and
    wherein the solid carbonaceous residue is separated from the reducing gaseous stream before the reducing of the at least one metal ore.

6. The process of claim 5, wherein the solid carbonaceous residue is at least partly fed to the reducing of the at least one metal ore as solid reducing agent.

7. The process of claim 1, wherein the reducing gaseous stream is subjected to treatment, to reduce water vapour content of the reducing gaseous stream, before the reducing of the at least one metal ore.

8. The process of claim 1, wherein the reducing gaseous stream is subjected to a water gas shift reaction wherein the CO and the water vapour present in the reducing gaseous stream react with each other, producing $CO_2$ and $H_2$.

9. The process of claim 1, wherein at least part of heat of the at least one exhausted gaseous stream leaving the reducing of the at least one metal ore is transferred to the reducing gaseous stream.

10. The process of claim 1, wherein the at least one exhausted gaseous stream also comprises part of the at least one hydrocarbon which has not reacted in the carrying out of the reaction between the stream of the carbon dioxide and the stream of the at least one hydrocarbon, and
    wherein the at least one exhausted gaseous stream is treated to separate a stream comprising $CO_2$ and a stream of the non-reacted at least one hydrocarbon.

11. A process for synthesis of a reducing gaseous mixture, the process comprising:
    reacting at least one hydrocarbon with carbon dioxide;
    wherein the reaction between the at least one hydrocarbon and the carbon dioxide is carried out at pressure greater than or equal to 0.5 atmospheres (atm) and less than or equal to 100 atm and at temperature greater than or equal to 950° C. and less than or equal to 1,350° C., and
    wherein the reaction between the at least one hydrocarbon and the carbon dioxide is a non-catalytic reaction.

12. The process of claim 11, wherein the at least one hydrocarbon is methane.

13. The process of claim 11, wherein the reducing gaseous mixture comprises $H_2$ and CO in a molar ratio $H_2$/CO greater than or equal to 0.2:1 and less than or equal to 3.5:1.

14. The process of claim 11, wherein a molar ratio $(H_2+CO)/(CO_2+H_2O)$ in the reducing gaseous mixture is greater than or equal to 8:1 and less than or equal to 25:1.

15. A process for synthesis of at least one hydrocarbon, the process comprising:
    carrying out a reaction between a stream of carbon dioxide and a stream of the at least one hydrocarbon, at pressure greater than or equal to 0.5 atmospheres (atm) and less than or equal to 100 atm and at temperature greater than or equal to 950° C. and less than or equal to 1,350° C., to produce a reducing gaseous stream comprising at least $H_2$, CO, $CO_2$, and water vapour; and
    subjecting the reducing gaseous stream to a Fisher-Tropsch reaction to obtain the at least one hydrocarbon;
    wherein the reaction between the stream of the carbon dioxide and the stream of the at least one hydrocarbon is a non-catalytic reaction.

16. The process of claim 1, wherein the temperature is greater than or equal to 1,000° C.

17. The process of claim 11, wherein the temperature is greater than or equal to 1,000° C.

18. The process of claim 11, wherein the temperature is less than or equal to 1,100° C.

19. The process of claim 11, wherein the temperature is less than or equal to 1,200° C.

20. The process of claim 15, wherein the temperature is greater than or equal to 1,000° C.

* * * * *